(12) United States Patent
McNaughton et al.

(10) Patent No.: US 7,437,917 B1
(45) Date of Patent: Oct. 21, 2008

(54) METHOD OF EVALUATING A DISC BRAKE ROTOR

(75) Inventors: Robert J. McNaughton, Howell, MI (US); Mark Malburg, Columbus, IN (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 11/420,233

(22) Filed: May 25, 2006

(51) Int. Cl.
*G01M 19/00* (2006.01)
(52) U.S. Cl. .......................................... 73/121
(58) Field of Classification Search .................. 73/121, 73/123, 126, 127, 128, 129, 130
See application file for complete search history.

(56) References Cited

U.S. PATENT DOCUMENTS

| | | | |
|---|---|---|---|
| 5,970,427 A | 10/1999 | Greenwald | |
| 5,974,878 A * | 11/1999 | Newell et al. | 73/462 |
| 6,233,533 B1 * | 5/2001 | Xu et al. | 702/91 |
| 6,499,347 B1 * | 12/2002 | Kugel et al. | 73/460 |
| 7,222,521 B1 * | 5/2007 | Smith et al. | 73/121 |
| 2002/0088316 A1 * | 7/2002 | Newell et al. | 82/1.11 |
| 2005/0049823 A1 * | 3/2005 | Link et al. | 702/168 |
| 2006/0032347 A1 * | 2/2006 | Newell et al. | 82/112 |

* cited by examiner

*Primary Examiner*—Eric S McCall
(74) *Attorney, Agent, or Firm*—Leo H McCormick, Jr.; Sarah Taylor

(57) ABSTRACT

A method for determining local departures of opposed friction surfaces that are spaced apart in parallel planes normal to the axis of the rotor. Displacement sensing probes are placed in opposing alignment adjacent the friction surfaces and rotor is spun. Instantaneous distances from each probe to the friction surfaces is made by repetitively sampling and converting the sample distances into digital form. The differences between contemporaneous sample distances are computed to determine rotor thicknesses and displayed. An analog measure of the instantaneous angular rotor position is provided for each instantaneous angular position. The angular rotor position and distance measures are correlated and the angular rotor position sample converted to digital form. While the time interval between successive distance samples is constant the rotor angular velocity may vary during a revolution and spline-based interpolation between successive distance samples is performed to obtain to obtain a representation of equiangularly spaced sample values.

22 Claims, 5 Drawing Sheets

METHOD OF EVALUATING A DISC BRAKE ROTOR

The present invention relates to a method of evaluating dimensional variations on braking surfaces of a rotor for a disc brake.

BACKGROUND OF THE INVENTION

A braking system for a vehicle includes a flat disc or rotor that is fixed to and rotatable with an associated vehicle wheel and a caliper that is fixed to the vehicle chassis spans the rotor. A pair of friction surfaces or pads retained by the caliper are urged by pressurized fluid acting on a piston and the caliper housing into engagement with opposed rotor faces to effect a brake application. When the pressurized fluid is released the resiliency of a seal associated with the piston moves the piston and caliper housing to provides sufficient running clearance between the pads and the rotor. In some instances, a controlled rotor wobble or run-out is desirable to supplement the restorative force of the resilient seals to retract pads from the rotor after a braking event. However excessive wobble or other deviations from opposed flat surfaces orthogonal to the wheel axis can cause brake chatter, excessive rotor wear and other undesirable results. Thus, it is desirable to maintain dimensional tolerances between the rotor and brake pads. It is also desirable to easily inspect brake rotors to determine if the dimensional tolerances are being met as well as for signs of abnormal wear and manufacturing or material defects. These inspections may be performed during manufacture or subsequently after the rotor has been installed on a vehicle.

Brake rotors have been inspected on a vehicle through a dial indicator magnetically fastened to a suspension component. The dial indicator reading is recorded while rotating the wheel, but the method provides only run-out data for one brake plate surface. When further investigation is needed, the rotor is removed from the vehicle and sent to the manufacturer's or supplier's warranty center where a precision spindle and a controller are used to rotate the rotor at a constant speed. Even under controlled laboratory conditions, speed variations may sometimes undermine the accuracy of the test results.

U.S. Pat. No. 5,970,427 discloses a disc brake testing device having a pair of gauges on opposite disc sides and aligned with one another to measure thickness and lateral run-out of a brake disc that may be employed when the disc is surrounded by a wheel and dust shield. Several varieties of contact as well as non-contact gauges or probes are disclosed. The device may be employed in a computer operated testing system and may compare test results with industry standards. The position measurements are taken by the pair of gauges as a function of the disc position, and are frequently taken in a periodic manner which is either time-dependent or dependant on the angular position of the disc relative to the pair of gauges. Time-dependent measurements may be provided by employing a clock circuit which reads the position measurement output of the gauges at a certain point in a timing cycle. Angular position-dependent measurements may be taken by providing an incremental reference index of the relative position of the gauges with respect to the disc, and reading the position measurement output of the gauges as each increment is passed. If the position signals are analog in character, then an A/D converter is provided for converting the position signals into digital signals which may be processed by a microprocessor which serves as means for processing the position signals to determine the thickness and lateral run-out of the disc. The A/D converter may also amplify or otherwise condition the position signals as necessary to provide digital signals which are compatible with the microprocessor. In addition to communicating with the A/D converter to receive the digital signals, the brake testing system has an instruction set which contains instructions for directing the microprocessor to operate on the digital signals to generate characterizing data which indicate the condition of the disc. The instruction set can be either code which can be accessed by the microprocessor, or may be imbedded in the microprocessor. The characterizing data typically include the lateral run-out of the brake disc as well as a characterization of the thickness of the disc, such as the average of all instantaneous thickness measurements taken. Typically, for lateral run-out, the standard values have only a maximum allowable value for lateral run-out. If the calculated value for the lateral run-out is less than or equal to the maximum allowable value, the disc is considered to fall within acceptable limits for lateral run-out. For average thickness, the standard values typically include a minimum allowable thickness value, and may additionally include a "machine to" value. Thickness variation may also be calculated as part of the thickness characterization. If the thickness variation is less than or equal to a maximum variation standard value, the thickness variation of the disc is considered to be acceptable. However, U.S. Pat. No. 5,970,427 makes no mention of rotor speed compensation, harmonic analysis, or interpolation, all of which are desirable features and provide for rotor analysis of far greater scope and accuracy.

Thus, the prior art is capable of providing rather limited information about a rotor being tested. However, the information is limited to average high and low region values and the number of such regions sensed.

It would be highly desirable to provide each specific high and low value as well as the angular location of each such high or low value.

It would also be highly desirable to provide sufficient accurate data from a rotor to perform a wide variety of rotor analyses and diagnostics.

SUMMARY OF THE INVENTION

The present invention provides solutions to the above problems and disadvantages by providing an economical and versatile rotor testing system applicable to on-vehicle testing as well as off-vehicle testing.

The invention comprises, in one form thereof, a method of converting a first set of chronologically equally spaced samples of dimensions taken from a rotating disc brake rotor into a second set of equiangularly spaced samples of disc brake rotor dimensions by first causing the rotor to rotate about a rotor axis and identifying at least one angular reference location on the rotor. Time is measured from an initial identification of the angular reference location. Variations in axial location of points on an annular surface portion of the rotor are measured and the relationship between the measured variations and the measured time recorded. The relationship between measured time and angular location relative to the angular reference is then computed and the relationship between measured variations and angular location relative to the angular reference inferred. An accurate relationship between measured variations and angular location relative to the angular reference may then be displayed or recorded.

The invention defines a method of monitoring the deviation of a disc brake rotor from a theoretical surface of revolution includes causing the rotor to rotate about a rotor axis and identifying at least one angular reference location on the rotor. Variations in axial location of points on an annular surface portion of the rotor are measured and the measured variations as a function of angular location relative to the angular reference recorded. The measured variations may then be displayed as a function of angular location relative to the angular reference. The step of displaying may include performing a harmonic analysis on the sample digital forms and displaying potential harmonics in terms of undulations per revolution. The steps of identifying, measuring, recording and displaying may be repeated one or more times along a second annular region on either the same side or on the opposite side of the rotor. The step of repetitively sampling may be performed over a plurality of complete rotor revolutions to minimize the effect of rotor speed variations during a single revolution. This minimization may include performing a spline-based interpolation on the sample digital forms.

An advantage of the present invention is that rotor irregularities may be pinpointed and, for example, a high spot on a rotor caused by a cast rotor cooling too fast or a die imperfection can be traced back to its cause in the die that cast it.

Another advantage is wheel speed compensation which provides equiangularly spaced samples.

A further advantage is unique numerical processing of the test data and presentation of the results.

A still further advantage is that data processing employs mathematical functions based on spline interpolations and can account for speed variations in the rotation of the rotor or wheel during measurement.

Another unique feature of the invention is that rotor geometry may be represented in a three dimensional view indicating the form error's magnitude and location on the rotor.

In the present invention, non-contact displacement capacitive sensors supply analog signals to signal conditioning circuitry which scales and filters the output of the capacitive sensors to noise-free voltage signals which are then conveyed to an analog to digital converter. The digital information is then processed in numerous ways to provide data on the rotor. This system eliminates the need for speed control, and can measure not only roundness, flatness, and run-out, but also thickness variation, parallelism, and other characteristics of the brake rotor and caliper assembly while rotating and driving on the road, in a chassis dynamometer, or in a standard dynamometer. One type of thickness variation is generated when the brake surface is not consistently perpendicular with respect to the axis of rotation. The lack of perpendicularity translates into run-out when the rotor, caliper, and brake pads generate an uneven rotor wear that produces two thin to-high spots. These anomalies produce pulsations in the brake system, which are undesirable and indicate the need to investigate the source of the pulsation.

BRIEF DESCRIPTION OF THE DRAWINGS

Corresponding reference characters indicate corresponding parts throughout the several drawing views.

DETAILED DESCRIPTION OF THE INVENTION

Figure 1:
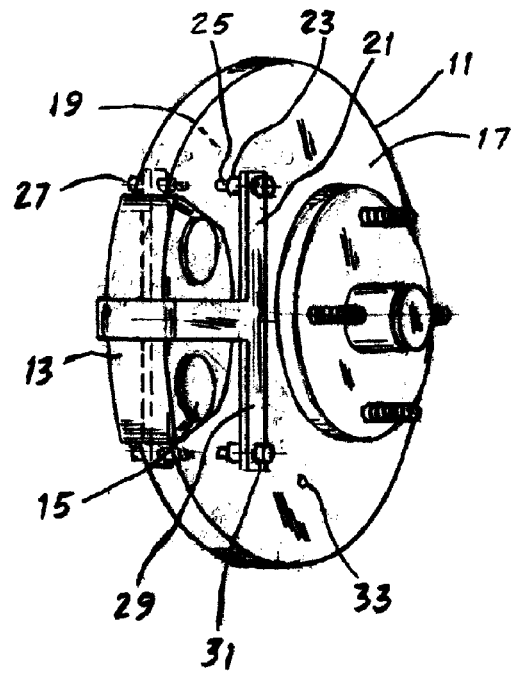
FIG. 1 is a simplified oblique view of a vehicle wheel and disc brake mechanism.
Figure 3:
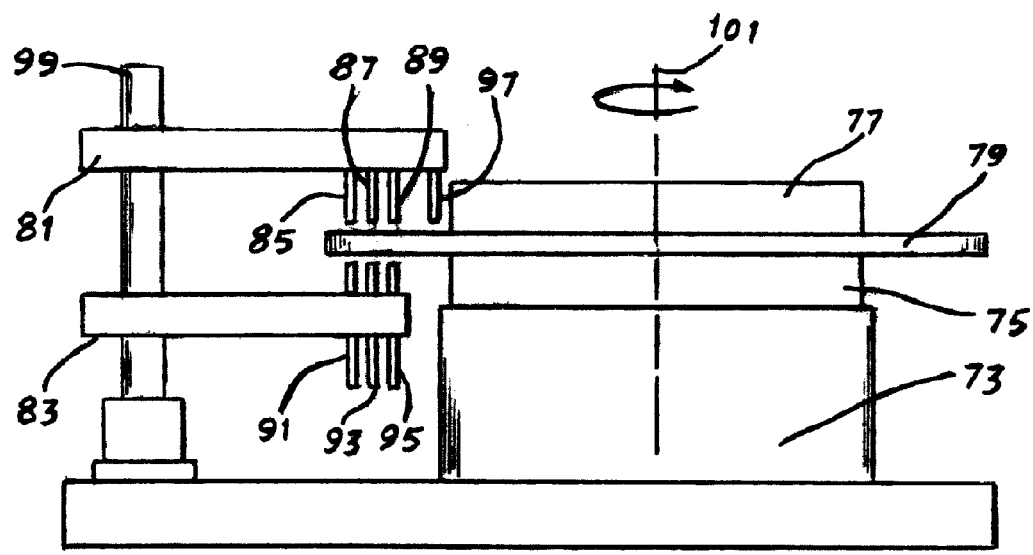
FIG. 3 is a side elevation view of another disc brake rotor test setup.

FIG. 1 is a schematically illustration of a portion of a vehicle wheel and disc brake mechanism wherein a rotor 11 is fixed to and rotatable with a vehicle wheel. The tire and rim of the wheel have been removed from the hub and lugs. A caliper 13 associated with an anchor has retains a pair of rotor engaging friction surfaces or pads located on opposite sides of the rotor 11. The pads are urged into engagement with opposed sides of faces 17 and 19 of the rotor 11 by a pair of hydraulic cylinders (pistons) such as 15. An arm 21 fixed to the caliper housing spans the rotor 11 to support a sensor 23 and probe 25 in a position closely adjacent the rotor surface 17. A similar sensor 27 is similarly mounted closely adjacent the opposite rotor surface 19 in alignment with the sensor 23. The sensors may be mounted to any other convenient non-rotating vehicle member as desired. The sensor probes such as 25 engage the surfaces and the distance between the probes is the thickness of the rotor. As the rotor rotates, rotor thickness variations or other surface variations force one or the other probes toward its respective sensor and the sensor outputs provide a measure of rotor thickness as well as variations in the distances from reference points to each rotor surface. The sensors may be any of several known contact varieties but non-contact sensors such as the non-contact displacement capacitive sensors illustrated in FIG. 3 are the preferred sensors. In all cases, the probes provide signals indicative of distances from some fixed reference to the rotor surface. An additional arm 29 is fixed to the caliper 13 or other non-rotating member and supports a further sensor 31 closely adjacent one of the rotor surfaces, surface 17 as shown, and monitors the rotor during rotation for passage of a location or reference indicia 33. This sensor and indicia function to indicate the beginning and end of one complete wheel or rotor revolution. The indicia may be a piece of reflective tape, a timing mark or other indicia imbedded in the disc or rotor and the sensor any compatible sensing device.

Figure 2:
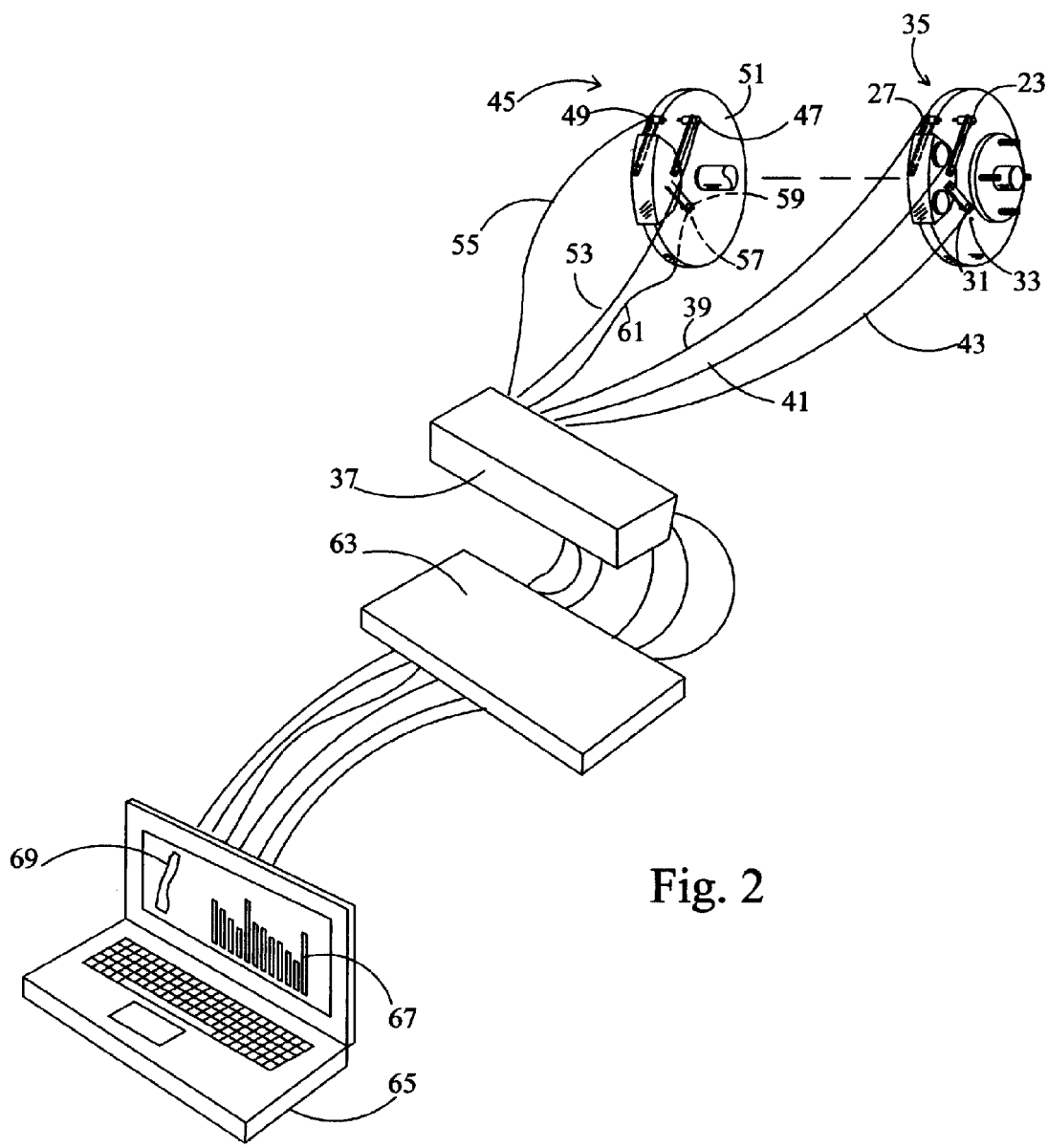
FIG. 2 is a simplified oblique view of a disc brake rotor test setup including a pair of vehicle wheel and disc brake mechanisms from FIG. 1.

In FIG. 2, the wheel and disc brake assembly of FIG. 1 is indicated generally by 35. The outputs from sensors 23, 27 and 31 are coupled to a signal conditioning unit 37 by electrical cables 39, 41 and 43. A second similar wheel and disc brake assembly 45 representing, for example, the other front wheel of a vehicle, is also shown. The assembly 45 has similar pair of opposed sensors 47 and 49 supplying data regarding the rotor 51 by way of lines 53 and 55 to the signal conditioning circuitry 37. A timing or synchronization mark 57 is detected by sensor 59 and its presence transmitted to the signal conditioner 37 by way of line 61. The signal conditioner 37 scales and filters the outputs of the several displacement sensors provide the waveform acquisition unit 63 six noise-free analog inputs that are converted into digital form and supplied to a small laptop or notebook style computer 65. The acquisition unit 63 may be a WaveBook or similar signal processor that is capable of high speed channel scanning of any combination of numerous channels in response to single or multi-channel analog triggering with programmable level and slope. Up to sixteen digital inputs can be scanned synchronously with analog signals. The unit is operable from AC line, a 10 to 30 VDC source, such as a car battery, or an optional compact rechargeable battery module. Specifically, the WaveBook in the present embodiment is a unit that is commercially available from IOTECH of 25971 Cannon Road, Cleveland, Ohio 44146. The WaveBook is portable high-speed waveform acquisition system capable of streaming large amounts of acquired data into an attached computer system. Six individual signal lines are illustrated, but fewer lines may transmit multiplexed data if desired. The digital signals from the signal processor 63 are supplied to the computer 65 where extensive processing may occur. The processing results may be displayed as a bar graph 67, analog representation of rotor thickness as at 69 or in other suitable form. In summary, analog rotor parameters are sensed by sensors such as 23, the analog outputs of which are filtered at 37, converted to digital form at 63 and mathematically manipulated for display on computer 65.

Figure 4:
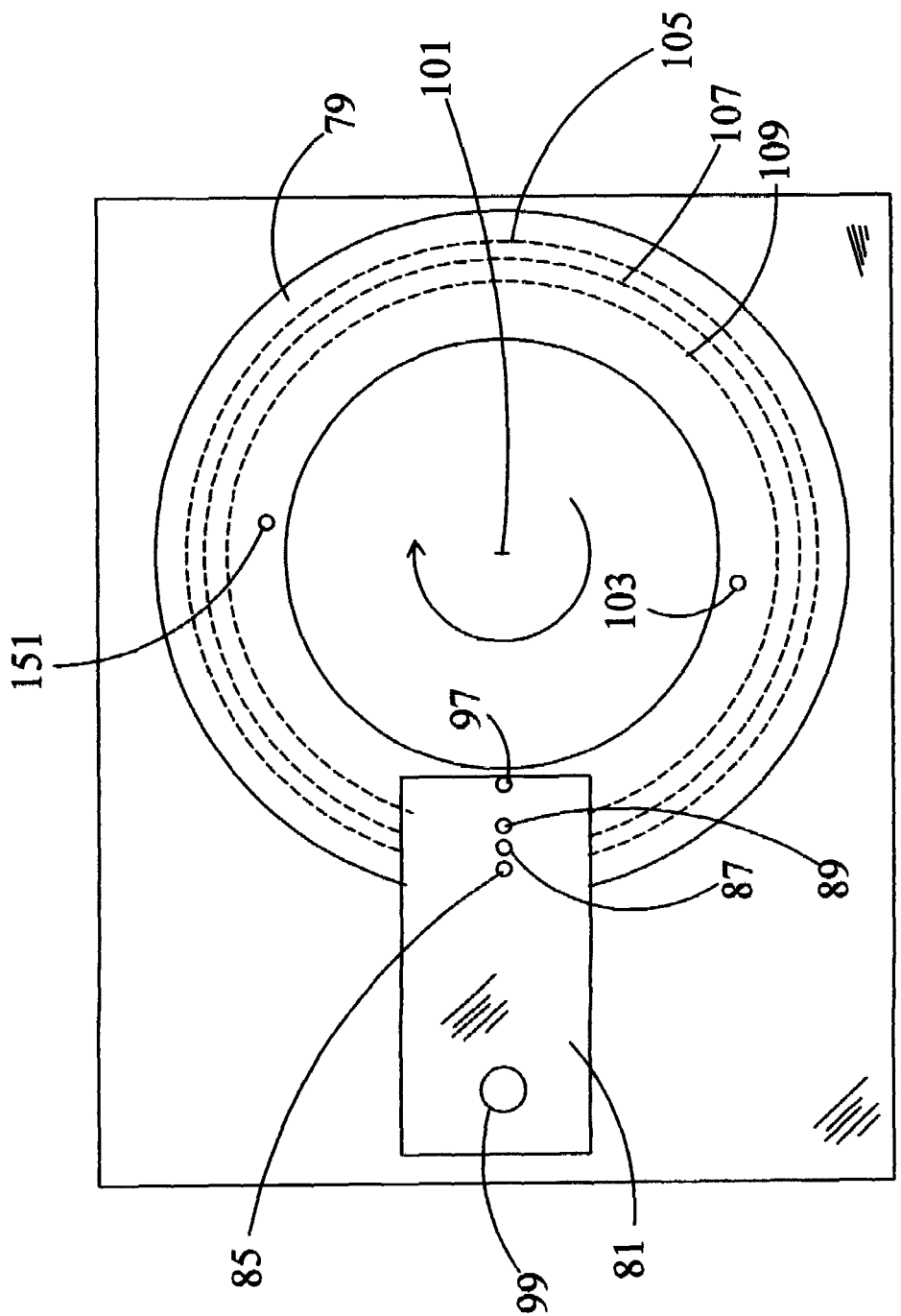
FIG. 4 is a top plan view of the test setup of FIG. 3.

Velocity compensating mathematics will handle an arbitrary number of pulses per revolution as provided by the timing marks 33 and 57 shown in FIGS. 1 and 2, or multiple pulses per revolution provided by additional rotor angular position indicia such as mark 151 on rotor 79 shown in FIG. 4. With multiple equiangularly spaced indicia, a further analog or digital indication of which indicia is used as the starting point or zero degree mark is desirable. More pulses per revolution provide more accuracy, whereas a single pulse per revolution provides a faster measurement setup. For most portable, shop-based measurements a single pulse is adequate.

The system as described senses rotor variations along a relatively narrow annular strip with a radial width of the strip that is smaller than the rotor surface engaged by the pads during a braking event. A more complete measuring of the rotor surface is utilized when braking is obtained by a set-up such as shown in FIGS. 3 and 4. A pedestal 73 supports a rotatable pair of clamping surfaces 75 and 77 which grip the rotor 79. Upper 81 and lower 83 arms extend along opposite rotor sides and support sensors 85, 87, 89, 91, 93 and 95. Arm 81 may pivot about the support post 99 to allow placement and removal of rotors. Opposed sensor pair 85 and 91 map rotor variations along an outer annular path 105 while the pair 87 and 93 are aligned with one another to sense the rotor variations along an intermediate annular strip 107. An innermost strip 109 is sensed by the pair 89 and 95. Each sensor pair functions much the same as previously described. The sensors provide an indication of variations in the distance from the rotor surface to some fixed reference point, the adjacent surfaces of the arms 81 and 83, for example. Any other fixed reference location could be employed. A common reference signal indicating the beginning of a sampling revolution may be derived from sensor 97 and a timing or reference indication 103 which provides a function similar to that of 33 in FIG. 1. Pedestal 73 contains a drive mechanism for rotating the rotor 79 about axis 101 at a relatively constant speed. Synchronization might also be derived from the pedestal 73 rotary drive mechanism and sensor 97 omitted, or drive speed may be adequately controlled so as to not require synchronization in some cases.

Figure 5:
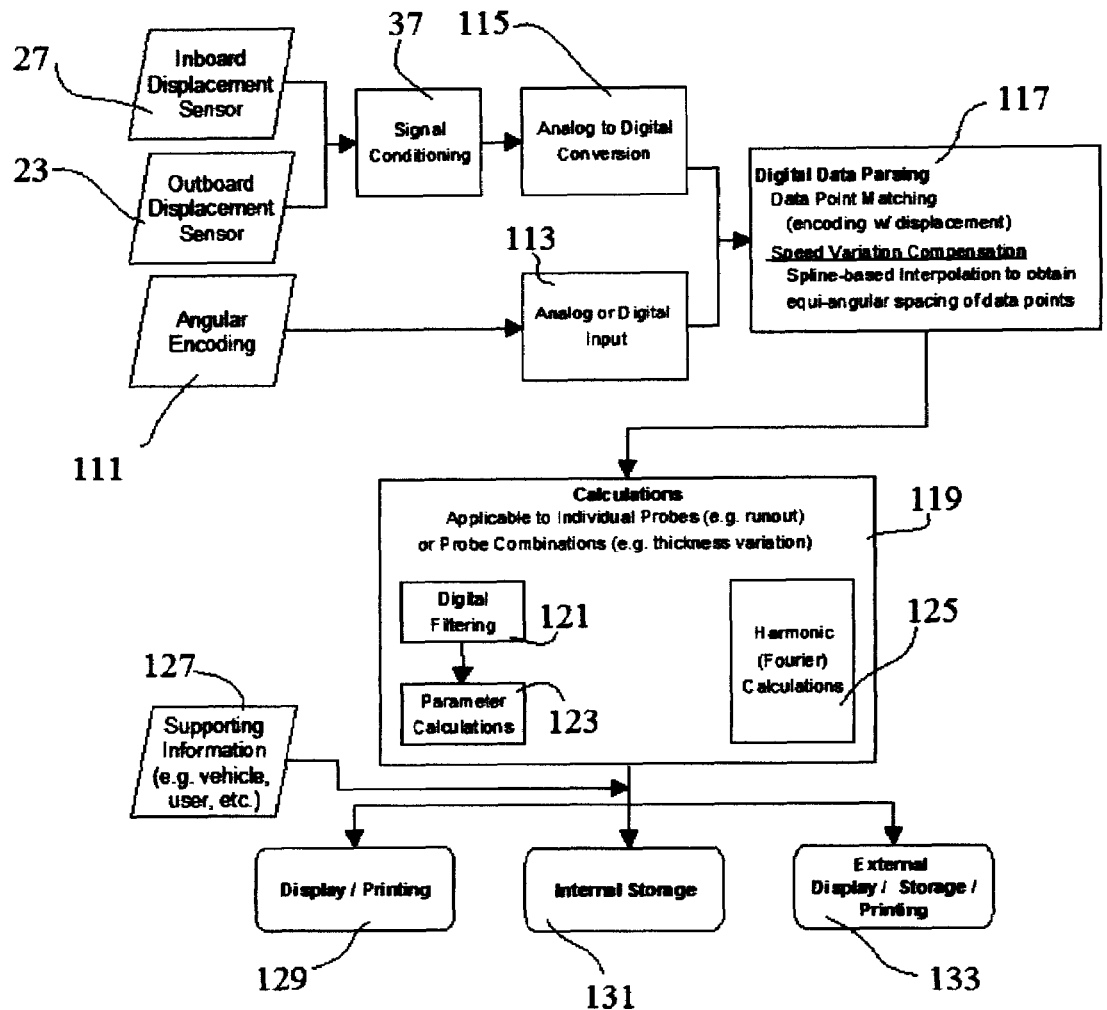
FIG. 5 is a functional block diagram illustrating disc brake test unit operation.

Operation of a system such as shown in FIG. 2 for a single rotor and brake assembly 35 is illustrated in FIG. 5. Angular encoding 111 may be derived from the timing mark 33 passing under the sensor 31. It may be either analog or digital as indicated at 113. In FIG. 2, an analog synchronizing signal was passed through the signal conditioner 37 and converted to digital form by the acquisition unit or signal processor 63. The signal conditioning 37 is basically filtering and scaling as performed by the unit 37 in FIG. 2. Analog to digital conversion 115 is achieved by the signal processor 63. The digital sampling of rotor surface distances is performed at equal time intervals. If the rotor speed is not constant, the samples are not equiangularly spaced. These speed variations may be compensated for at 117 by mapping velocity with respect to time. In practice, angular velocity is not constant within a given revolution. Multiple revolutions are sampled and the associated time when each pulse occurred is recorded. A spline (a smooth, but wiggly mathematical curve) is applied to the pulse versus time data. This provides a determination of the time at which each angular position was actually sampled or probed. This operation constitutes a first spline interpolation. With this data, a determination of which data points are relevant at each position on the rotor may be made. Typically, angular values of interest will fall in between the raw measured points. This is where a second spline interpolation is performed and the value at the desired angular location is derived based on the second spline interpolation through the neighboring points. Linear interpolations could be employed, but spline interpolations yield a somewhat better result than linear interpolations. Thus, digital data parsing 117 entails numerous calculations to compensate for small speed variations within a single rotor revolution and to match encoded sample values with rotor displacement.

Figure 6:
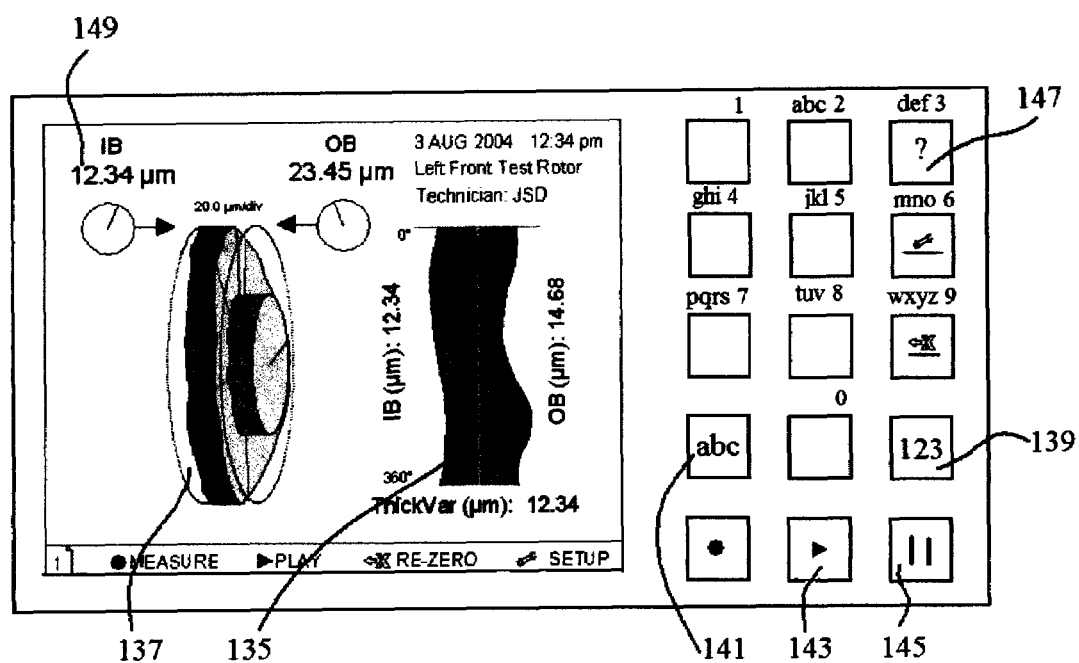
FIG. 6 is a front elevation view of a portable disc brake test unit.

Further calculations at 119 include digital filtering 121 and calculation 123 of the parameters to be recorded as at 131, displayed as at 129 or 133 or otherwise utilized. Typical calculations for inboard or outboard sides of the rotor include many parameters. Lateral run-out, that is, the minimum to maximum probe deflection as the rotor rotates is useful. The flatness or deviation relative to a reference plane is used to suppress tilt errors exploiting only the surface deviations. Sector run-out is the minimum to maximum probe deflection within an angular window. Typical angular windows are 10, 30 or 60 degrees, but other values can be used. In this analysis, the angular window is swept around the data and the worst-case peak-to-valley error contained with the window is reported. The window's location is sometimes displayed along with the peak-to-valley value. Rotor thickness variation which is the minimum to maximum thickness encountered in one revolution or sector thickness variation which is the rotor thickness variation within an angular window may also be determined. Certain ones of these calculations are typically based on low-pass filtered profiles. Filtering removes the unstable, high frequency features in the data such as surface roughness, pits, scratches, etc. There are several filters that are standardized for the analysis of geometric forms. Gaussian filtering has been employed successfully. The portable systems such as shown in FIG. 6 will incorporate robust, spline-based filtering which allows for the suppression of grooves and/or drillings associated with high performance rotors. The harmonic content of rotor thickness variation, that is, the amplitudes and phases of the sinusoidal components of the thickness variation is also a very useful parameter.

The harmonic calculations 125 determine the amplitudes and phases for each harmonic associated with the probes run-out. The harmonic calculations are based on Fourier transforms. There are many algorithms for doing this, some are called direct, discreet or fast. Some algorithms require data set sizes that are integral powers of 2. Other algorithms can handle any number of data points. Harmonic analysis for brake rotors is very useful in helping to understand vibrations in that it reports the amplitude at each frequency. Some rotors may have a high amplitude at a frequency of two undulations per revolution. This means that there are two equally spaced bumps in every revolution of the rotor. This can cause a significantly different "feel" to the driver than would a high amplitude at one undulation per revolution. Harmonic analysis can be applied to each side of the rotor looking at the frequencies associated with inboard run-out and outboard run-out. Harmonic analysis can also be applied to the thicknesses around the rotor to describe the frequencies associated with thickness variation. The harmonic analysis of thickness variation is a very useful tool in understanding brake pedal pulsation. Calculations for multiple wheels as shown in FIG.

2, or for multiple scan paths as shown in FIGS. 3 and 4 proceed in the same fashion for each pair of sensors.

A small portable test unit as might be employed in a vehicle is illustrated in FIG. 6 that includes electronics to perform the above discussed functions. A keypad provides for user input of information such as which parameters are to be displayed in tabular or graphic form, or recalling stored information. The keypad allows the insertion of identification of a particular test vehicle, rotor or other support information as at 127 in FIG. 5. The keypad may be switched between numeric 139 and alphabetical 141 entry. Illustrative keys such as play 143, pause 145, help 147 and other typical function entry keys are shown. A depiction of the two rotor surfaces over a single revolution similar to 69 in FIG. 2 is illustrated at 135 while an oblique depiction of the rotor under test is shown at 137. Numerical values may also be displayed such as at 149 for the bar graph similar to 67 in FIG. 1 and other data displays are possible.

What is claimed is:

1. A method of evaluating a disc brake rotor formed as a solid of revolution about an axis having a pair of opposed spaced apart generally parallel brake friction surfaces to determine the departure of the opposed friction surfaces from spaced apart plane parallel surfaces normal to the axis, comprising:
   placing a pair of sensing probes each closely adjacent a respective friction surface in opposing alignment with one another;
   rotating the disc brake rotor about the axis;
   providing analog measures of the instantaneous distances from probe reference points to the friction surfaces adjacent the respective probes;
   repetitively sampling the instantaneous distance measures and converting the sample values to digital form
   spline-based interpolating between successive distance samples to obtain a representation of equiangular spaced sample values; and
   displaying the representation of the sample values.

2. The method of claim 1, wherein the step of displaying includes computing the difference between contemporaneous sample values to determine rotor thickness and displaying the result.

3. The method of claim 1, wherein the representation is numerical.

4. The method of claim 1, wherein the representation is graphical.

5. The method of claim 1, further including the steps of:
   placing an additional pair of sensing probes each closely adjacent a respective friction surface in opposing alignment with one another and spaced radially inwardly from the prior placed pair;
   providing analog measures of the instantaneous distances from additional probe reference points to the friction surfaces adjacent the respective additional probes;
   repetitively sampling the instantaneous distance measures provided by the additional probes and converting the additional sample values to digital form; and
   displaying a representation of both the sample values and additional sample values.

6. The method of claim 1, wherein the step of repetitively sampling is performed over a plurality of complete rotor revolutions to minimize the effect of rotor speed variations during a single revolution.

7. The method of claim 1 wherein the step of displaying includes performing a harmonic analysis on the sample digital forms and displaying potential harmonics in terms of undulations per revolution.

8. The method of claim 1, further including the step of providing an analog measure of the instantaneous angular rotor position, repetitively sampling the instantaneous angular position measure, correlating the angular rotor position and distance measures, and displaying a representation of the angular rotor position sample values with the corresponding distance sample values.

9. The method of claim 8, wherein the time interval between successive distance samples is constant.

10. The method of claim 9, further including the step of interpolating between successive distance samples to obtain and display a representation of equiangularly spaced sample values.

11. A method of converting a first set of chronologically equally spaced samples of dimensions taken from a rotating disc brake rotor into a second set of equiangularly spaced samples of disc brake rotor dimensions, comprising:
    causing the rotor to rotate about a rotor axis a plurality of times;
    identifying at least one angular reference location on the rotor;
    measuring time from an initial identification of the angular reference location;
    measuring variations in axial location of points on an annular surface portion of the rotor;
    recording the relationship between the measured variations and the measured time;
    computing the relationship between measured time and angular location relative to the angular reference, said computing includes performing a spline-based interpolation between neighboring recorded annular reference values;
    inferring the relationship between measured variations and angular location relative to the angular reference; and
    displaying the relationship between measured variations and angular location relative to the angular reference.

12. The method of claim 11, further including identifying additional angular reference locations equiangularly spaced about the rotor.

13. The method of claim 11, including the additional steps of:
    measuring variations in axial location of points on a second annular surface portion of the rotor;
    recording the relationship between the last mentioned measured variations and the measured time;
    inferring the relationship between the last mentioned measured variations and angular location relative to the angular reference;
    filtering the measured variations with a spline-based filter; and
    displaying the relationship between the last mentioned measured variations and angular location relative to the angular reference.

14. The method of claim 11, including the additional steps of:
    measuring variations in axial location of points on a second annular surface portion of the rotor;
    recording the relationship between the last mentioned measured variations and the measured time;
    inferring the relationship between the last mentioned measured variations and angular location relative to the angular reference;
    filtering the measured variations with a robust spline-based filter; and
    displaying the relationship between the last mentioned measured variations and angular location relative to the angular reference.

15. The method of claim 14, wherein the annular surface and second annular surface are generally coplanar and radially separated from one another.

16. The method of claim 14, wherein the annular surface and second annular surface are located on opposite rotor sides at the same radial distance from the rotor axis and including the additional step of computing rotor thickness variations as a function of angular location.

17. A method of monitoring deviations of a disc brake rotor from a theoretical surface of revolution, comprising:
- causing the rotor to rotate about a rotor axis;
- identifying at least one angular reference location on the rotor;
- measuring variations in axial location of points on a first annular surface portion on a first side of the rotor and a second annular surface portion on a second side of the rotor opposite said first side, said first and second annular surface portions being located at a same radial distance from the rotor axis;
- computing rotor thickness variations as a function of angular location;
- converting the measured variations to digital forms;
- performing a spline-based interpolation on the digital forms;
- recording the converted and interpolated measured variations as a function of angular location relative to the first angular reference; and
- displaying the converted and interpolated measured variations as a function of angular location relative to the first angular reference.

18. The method of claim 17, including the additional steps of:
- measuring variations in axial location of points on said second annular surface portion of the rotor;
- recording the last mentioned measured variations as a function of angular location relative to the first angular reference; and
- displaying the last mentioned measured variations as a function of angular location relative to the first angular reference.

19. The method of claim 17 wherein the first annular surface and second annular surface are generally coplanar and radially separated from one another.

20. The method of claim 17, wherein the step of measuring variations is repeated over a plurality of rotor revolutions to effectively eliminate any effects of speed variation within a single revolution.

21. The method of claim 17, wherein the step of displaying includes performing a harmonic analysis on the sample digital forms and displaying harmonics in terms of undulations per revolution.

22. The method of claim 17, wherein the step of recording the measured variations as a function of angular location relative to the angular reference includes:
- identifying at least one angular reference location on the rotor;
- measuring time from an initial identification of the first angular reference location;
- recording the relationship between the measured variations and the measured time;
- computing the relationship between measured time and angular location relative to the first angular reference; and
- inferring the relationship between measured variations and angular location relative to the first angular reference.

* * * * *